United States Patent
Reuschel et al.

(10) Patent No.: US 8,992,058 B2
(45) Date of Patent: Mar. 31, 2015

(54) LIGHTING DEVICE FOR A MOTOR VEHICLE WITH LIGHT GUIDE ELEMENTS

(75) Inventors: Jens Dietmar Reuschel, Ingolstadt (DE); Christoph Schmitz, Abensberg (DE)

(73) Assignee: Audi AG, Ingolstadt (DE)

( * ) Notice: Subject to any disclaimer, the term of this patent is extended or adjusted under 35 U.S.C. 154(b) by 31 days.

(21) Appl. No.: 13/438,441

(22) Filed: Apr. 3, 2012

(65) Prior Publication Data

US 2012/0250341 A1  Oct. 4, 2012

(30) Foreign Application Priority Data

Apr. 4, 2011  (DE) .................. 10 2011 016 001

(51) Int. Cl.
| | | |
|---|---|---|
| *B60Q 1/00* | (2006.01) | |
| *B60Q 1/26* | (2006.01) | |
| *B60Q 3/00* | (2006.01) | |
| *B60Q 3/02* | (2006.01) | |
| *B60Q 9/00* | (2006.01) | |
| *F21V 8/00* | (2006.01) | |

(52) U.S. Cl.
CPC .............. *B60Q 3/004* (2013.01); *B60Q 3/0216* (2013.01); *B60Q 3/0283* (2013.01); *B60Q 9/007* (2013.01); *G02B 6/0028* (2013.01); *G02B 6/0076* (2013.01); *G02B 6/006* (2013.01)
USPC ........... 362/488; 362/540; 362/541; 362/542; 362/511; 362/487; 40/547

(58) Field of Classification Search
USPC ..................... 362/31, 26, 540–542, 511, 800, 362/487–507; 40/546–547
See application file for complete search history.

(56) References Cited

U.S. PATENT DOCUMENTS

| | | | |
|---|---|---|---|
| 1,930,359 A | 10/1933 | Hilgenberg | |
| 2,623,313 A | 12/1952 | Fuchs | |
| 3,555,335 A | * 1/1971 | Johnson .................. | 313/499 |
| 4,974,354 A | 12/1990 | Hembrook, Jr. | |
| 5,075,826 A | 12/1991 | Lan | |
| 5,572,818 A | 11/1996 | Churchill | |
| 7,976,931 B2 | 7/2011 | Schilling et al. | |
| 2003/0030763 A1 | 2/2003 | Nishioka | |
| 2007/0268580 A1 | 11/2007 | Biebel et al. | |
| 2010/0142226 A1 | 6/2010 | Vogt et al. | |

FOREIGN PATENT DOCUMENTS

| | | |
|---|---|---|
| CN | 201081780 Y | 7/2008 |
| CN | 101501540 A | 8/2009 |
| DE | 39 19 925 | 12/1990 |
| DE | 198 22 636 | 11/1999 |

(Continued)

*Primary Examiner* — Anne Hines
*Assistant Examiner* — Jose M Diaz
(74) *Attorney, Agent, or Firm* — Henry M. Feiereisen LLC

(57) ABSTRACT

A lighting device for a motor vehicle includes a light source, at least two plate-shaped light guide elements having at least some areas that scatter or refract light, and a framework to maintain the at least two light guide elements in close proximity such that their mid-perpendiculars lie on a common straight line. The framework is configured to at least partly surround a boundary of the light guide elements and to guide light. The framework is coupled optically to the light source so that light is projected from the light source into the framework and from the framework into the light guide elements, and is conducted from the light guide elements to the outside.

18 Claims, 1 Drawing Sheet

(56) References Cited

FOREIGN PATENT DOCUMENTS

| | | |
|---|---|---|
| DE | 102 31 502 A1 | 1/2004 |
| DE | 103 59 156 B4 | 7/2005 |
| DE | 202005009098 | 10/2005 |
| DE | 102005006074 | 8/2006 |
| DE | 102008048751 | 4/2010 |
| DE | 102008054721 | 4/2010 |
| JP | 56-142093 | 10/1981 |
| JP | 2009-170325 | 7/2009 |
| WO | WO 2004/052682 | 6/2004 |
| WO | WO 2010/118795 | 10/2010 |

* cited by examiner

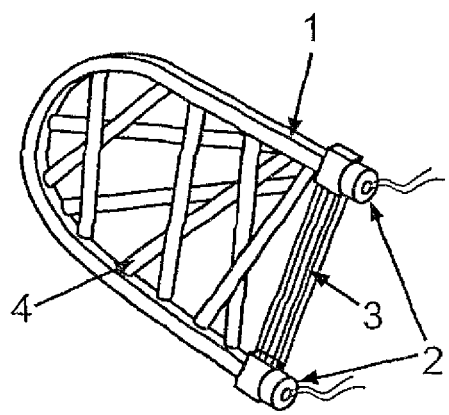
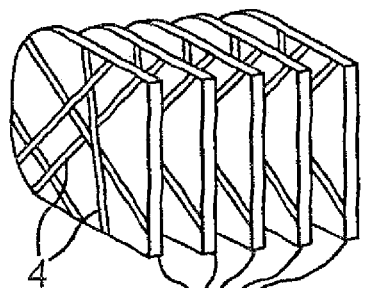
Fig.1
Fig.2
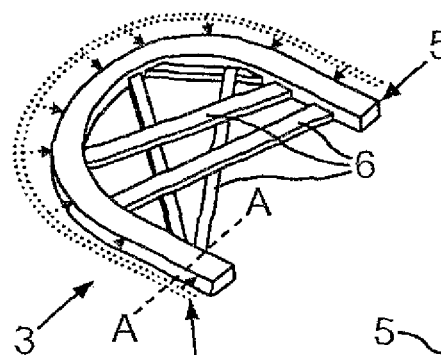
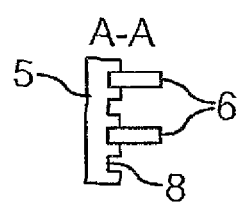
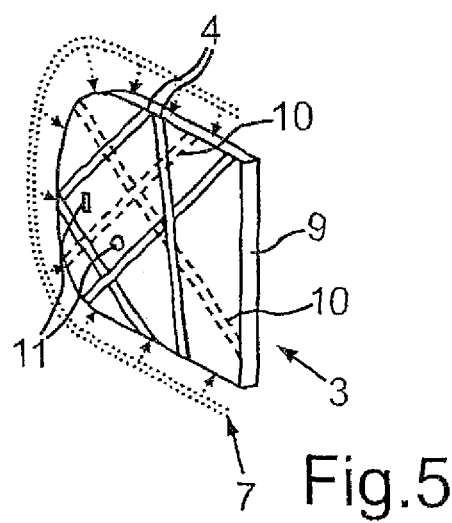
Fig.3
Fig.4
Fig.5

LIGHTING DEVICE FOR A MOTOR VEHICLE WITH LIGHT GUIDE ELEMENTS

CROSS-REFERENCES TO RELATED APPLICATIONS

This application claims the priority of German Patent Application, Serial No. 10 2011 016 001.9, filed Apr. 4, 2011, pursuant to 35 U.S.C. 119(a)-(d), the content of which is incorporated herein by reference in its entirety as if fully set forth herein.

BACKGROUND OF THE INVENTION

The present invention relates to a lighting device for a motor vehicle.

The following discussion of related art is provided to assist the reader in understanding the advantages of the invention, and is not to be construed as an admission that this related art is prior art to this invention.

Motor vehicles typically have several lights or lighting devices for illuminating the interior space. Predominantly, this involves lamps that can be switched on or off. Normally, these lamps are not intended to convey additional information that could be visually perceived by the vehicle occupant. Moreover, current vehicles are equipped with numerous assist systems to support the driver during maneuvering the vehicle, e.g. lane assistant, warning indication to the driver of a passing vehicle, ranging system, etc., and to alert also passengers, e.g. warning about an approaching cyclist, when opening the door. These assist systems predominantly trigger visual alerts and warnings. Thus, these visual alerts and warnings should be located at sites within the viewing range of the occupants.

It would be desirable and advantageous to provide an improved lighting device to obviate prior art shortcomings and to realize a spatial sense of depth when viewed.

SUMMARY OF THE INVENTION

According to one aspect of the present invention, a lighting device for a motor vehicle includes a light source, at least two plate-shaped light guide elements having at least some areas that scatter or refract light, a framework maintaining the at least two light guide elements in close proximity such that their mid-perpendiculars lie on a common straight line, the framework being configured to at least partly surround a boundary of the light guide elements and to guide light, wherein the framework is coupled optically to the light source so that light is projected from the light source into the framework and from the framework into the light guide elements, and is conducted from the light guide elements to the outside.

The at least two plate-shaped light guide elements, which can be partly transparent, are advantageously stacked in parallel layers. Light is projected into all light guide elements, i.e. in all layers of this arrangement, via the framework and extracted from each light guide element at respectively light-scattering or light-refracting zones. As a result of the layered formation, a spatial sense of depth is established in the illuminated state.

According to another advantageous feature of the present invention, the framework may include rails into which the light guide elements are slidable. In this way, several light guide elements can be installed in the frame work in a simple manner.

According to another advantageous feature of the present invention, the framework can be made substantially or entirely of a light guide. As the framework holds the light guide elements, there is already contact between the framework and the light guide elements. This direct contact is used to project light from the framework into the respective light guides. Efficiency of light projection increases the more the framework embraces the light guide elements. The framework thus assumes the dual function of holding the light guide elements and projecting light into these light guide elements.

According to another advantageous feature of the present invention, each of the light guide elements can include a transparent plate in which at least one structure is integrated to scatter or refract light which is projected into the plate. Thus, light projected by the framework into the boundary of each plate is extracted at particularly integrated structures. As a result, only the structures appear as luminous elements of the respective transparent plate or respective light guide element.

According to another advantageous feature of the present invention, each of the light guide elements can have at least one structure that has a different shape or is placed at a different location than all other light guide elements. When viewing the lighting device from the top side of the plate-shaped light guide elements in parallel relation to the common mid-perpendicular of the light guide elements, the individual structures of all plates can be seen because the structures are not positioned behind one another in viewing direction.

According to another advantageous feature of the present invention, each of the light guide elements may have several linear structures to scatter or refract light which is projected into the light guide element. For example, the transparent plates may include milled elongated grooves as linear structures. As a consequence of the milled surface, only the linear structures would illuminate and extract light from the plate.

According to another advantageous feature of the present invention, the linear structures can be configured as rods of a light-conducting material. Several rods arranged uniformly or irregularly and held by a holding frame can form together a plate-shaped light guide element. The light guide element has then respective openings between the individual rods.

According to another advantageous feature of the present invention, the framework can be constructed to project light into a major part of an outer boundary of each light guide element, with the light being extracted predominantly at the structures. This is beneficial because essentially only the structure illuminates, when the lighting device is switched on, whereas the remaining regions of the light guide element remain dark or only illuminate to a lesser degree.

According to another advantageous aspect of the present invention, a (driver) assist system can be equipped with a lighting device according to the present invention, with the lighting device being used for visual warning or providing information. Thus, the lighting device generates a visual alert that can be responded to by the driver or an occupant. In this way, the area of a door lining or center console, normally unused for information, can now be used for example for visual alerts in a motor vehicle.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a perspective illustration of one embodiment of a lighting device according to the present invention;

FIG. 2 is a perspective illustration of an arrangement of several light-conducting plates of the lighting device of FIG. 1 in parallel relationship;

FIG. 3 is a perspective illustration of another embodiment of a lighting device according to the present invention;

FIG. 4 is a cross sectional view of a framework; and

FIG. 5 is a perspective illustration of a light guide element with transparent plate and integrated structures.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective illustration of one embodiment of a lighting device according to the present invention for installation in a door lining or center console of a motor vehicle for example. The lighting device includes a framework 1 which has a substantially U-shaped configuration in FIG. 1. The framework 1 is made of light-conducting material, such as e.g. PMMA (polymethyl methacrylate). Arranged at the end faces of the legs of the framework 1, i.e. at the free ends of the framework 1, are light sources 2, respectively. Each light source 2 may for example be formed by an incandescent bulb or LED. Light generated by the light sources 2 is projected in a typical manner into the framework 1. Although FIG. 1 shows by way of example the provision of two light sources, it is, of course, also conceivable to use only a single light source 2 in order to project light into the framework 1.

According to an alternative embodiment, a frame may be provided which does not conduct light. The frame then includes a light guide which extends inside the frame. The framework is thus comprised in this case of a frame element assuming purely mechanical function and a light guide assuming solely the light-conducting function.

The framework 1 holds several parallel light guide elements 3, each having a plate-shaped configuration. In the non-limiting example of FIG. 1, each light guide element 3 has the contour of the inner surface of an U. Each plate-shaped light guide element 3 has a mid-perpendicular, with the mid-perpendiculars of all plate-shaped light guide elements 3 lying on a straight line.

The individual light-conducting plates of the light guide elements 3 are arranged side-by-side, as shown in FIG. 2. In the assembled state, the individual light guide elements 3 touch one another or are posited from one another at a slight distance. The individual light guide elements 3 are positioned directly behind one another, when viewed from a vantage point perpendicular to the plate surface of the individual light guide elements 3.

Each of the light guide elements 3 has one or more structures 4. In the drawings, structures 4 are involved which have a strip-shaped or linear configuration for example. The structures 4 can extend at any angle across the respective plate or light guide element 3. The structure 4 can be realized by milling or sand blasting the respective plate or by using lasers. The surface of the transparent plate is thereby roughened so that incident light on this roughened surface is scattered or refracted.

When the lighting device is switched on, light is projected from the framework 1 or the integrated light guide into the boundary of the plate-shaped light guide elements 3. Projection of light is suitably realized along a major part of the entire circumference of the light guide elements 3. Light is conducted within the plates normally through total reflection. When striking a structure 4, no total reflection occurs and light is extracted from the respective plate or respective light guide element 3. Extraction is established predominantly at such a steep angle that light shines through the neighboring transparent plates in the absence of any further total reflection. Light of the illuminating structures 4 radiates from the outermost plate directly to the outside, i.e. the interior space of the vehicle.

Thus, when the lighting device is switched on, the light-scattering or light-refracting structures 4 predominantly illuminate. Viewed from the surface, i.e. along the surface normal, all luminous structures 4 of all light guide elements 3 can be perceived. As the structures 4 lie in different planes as a result of their layered disposition, a spatial sense of depth (3-D effect) is realized.

In the non-limiting example of FIGS. 1 and 2, five layers or five plate-shaped light guide elements 3 are placed above one another. Of course, any other number of light guide elements or layers is conceivable as well. However, at least two such layers or light guide elements 3 should be provided.

The structures 4 to scatter or refract light are not arranged in symmetry but are arranged at different angles above one another. Of course, the structures may also be configured of different shapes. For example, they may be configured thinner or thicker or may be of varying thickness within each light guide element. There is also no need to begin the structures 4 at an interface with the frame or end at another location of the frame. In fact, the structures 4 may lie completely inside the respective plate. The structures may also have geometries that differ from a linear geometry, and thus can be configured in any curved shape. The structure may even be configured as points, graphics, ornaments or the like.

Referring now to FIG. 3, there is shown a perspective illustration of another embodiment of a lighting device according to the present invention. Parts corresponding with those in FIG. 1 are denoted by identical reference numerals and not explained again. The description below will center on the differences between the embodiments. In this embodiment, the light guide element 3 includes a holding frame 5 of U-shaped or horseshoe configuration. Rods 6 extend inside the light guide element 3 and made suitably of partly transparent material. As an alternative, the rods 6 may have a core made of fully transparent material and a surface that is roughened so that more light radiates to the outside while the interior encounters less total reflection.

The holding frame 5 is comprised of a fully transparent, light-conducting material. Light is projected into the end faces of the rods 6. Light from the outside, as indicated symbolically in FIG. 3, is projected into the framework 1 which is not shown in FIG. 3 for sake of simplicity.

In this embodiment, the plate-shaped light guide element 3 is not formed by a solid plate but comprised of the transparent holding frame 5 and rods 6 clamped between the legs of the holding frame. As a result, a plate-shaped construction with openings is realized.

FIG. 4 shows schematically the configuration of the holding frame 5 in cross section. The holding frame 5 includes several inwardly directed grooves 8 in which the rods 6 are inserted. As a result, light can effectively be projected from the holding frame 5 into the end faces of the individual rods 6.

FIG. 5 shows a further example of a partly transparent light guide element of plate-shaped configuration. Like in the examples of FIGS. 1 and 2, the light guide element 3 is provided with similar linear structures 4 which extend on the surface of the transparent plate 9. In addition, the transparent plate 9 further includes light-scattering structures 10 on the opposite bottom side. As the plate 9 has a certain thickness, the presence of the structures 4, 10 on the bottom and top sides of the plate provides a spatial sense of depth when the structures 4, 10 illuminate.

Illumination of the structures 4, 10 is implemented also in this case by projecting light 7 into the boundary of the plate 9. Projection of light is realized like in the embodiment of FIG. 1 by the framework 1 with the light sources 2.

FIG. 5 further shows that the transparent plate 9 may also have structure 11 of different shape.

With the present invention, a lighting device can be provided as a self-contained module which does not form an integrated multi-layer system but rather has several partly transparent layers which preferably do not touch one another but are spaced next to one another at a certain distance. The individual layers into which light can be projected via a light guide provide a three-dimensional configuration through the presence of structures incorporated in the individual layers by milling, etching, grinding or other machining processes and illuminating at increased brightness in the layers. The presence of the machined structures in the layers causes an extraction of light to produce a visual effect resulting from the real three-dimensional configuration of the lighting structure. Thus, the individual layers are optically independent from one another and can be fed with different light. The provision of the light guides further increases energy efficiency so that even electric vehicles can be equipped with a lighting device according to the present invention.

A motor vehicle has various components in the interior space that can be equipped with a lighting device according to the present invention. As described above, a door lining can be provided with such a lighting device. In this area and also at other locations, the lighting device can be used to assume a warning function.

The warning function can generally be realized by having a control unit check a signal. When the signal meets a pre-defined condition, the control unit controls the operation of a lighting device assigned for that condition. The lighting device has the structure as described above.

Warning functions are useful in particular for driver assist systems, as described above. The afore-described lighting device may, for example, be used for a ranging system which constantly checks whether a certain distance is maintained to a vehicle ahead. The control can hereby be realized for example by using radar. When the distance falls below a predefined minimum distance, the driver is suitably alerted, using the afore-described lighting device placed for example below the windshield, or on the dashboard, or the like.

A lighting device according to the present invention may also be used for a driver assist system in the form of a warning indication to the driver of a passing vehicle. In this case, the warning system includes a radar beam for example to scan the rearward area of a motor vehicle. When determining the presence of a passing vehicle and the own vehicle signals a move to the lane of the passing vehicle or a steering angle of the own vehicle is registered in a direction of the lane of the passing vehicle, a visual alert is triggered. This visual alert may involve, for example, a moving light generated along the inner side of the door at the side of the passing vehicle to indicate a passing maneuver by another vehicle. The moving light may be red for example and moves forwardly in travel direction.

A further application of the lighting device according to the present invention as part of an assist system may involve a "disembarking assistant". For example, when the vehicle stops next to a bicycle lane and an occupant wishes to disembark, a respective illumination at the door indicates whether or not it is safe to open the door. If there is no danger, this state can be indicated by green light on the inside of the door for example, whereas a potential danger as a result of an approaching or passing cyclist can be indicated by a red light.

Of course, other driver assist systems may be equipped with a lighting device according to the present invention. The lighting device may hereby be configured very large because it represents a high-quality decorative element when not in use.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A lighting device for a motor vehicle, comprising:
   a light source;
   at least two plate-shaped light guide elements, each having several linear structures to scatter or refract light which is projected into the light guide element, wherein the linear structures are configured as rods of light-conducting material;
   a framework maintaining the at least two light guide elements in close proximity such that their mid-perpendiculars lie on a common straight line, said framework being configured to at least partly surround a boundary of the light guide elements and to guide light, said framework coupled optically to the light source so that light is projected from the light source into the framework and from the framework into the light guide elements, and is conducted from the light guide elements to the outside.

2. The lighting device of claim 1, wherein the framework includes rails into which the light guide elements are slidable.

3. The lighting device of claim 1, wherein the framework is made substantially or entirely of a light guide.

4. The lighting device of claim 1, wherein each of the light guide elements includes a transparent plate in which at least one structure is integrated to scatter or refract light which is projected into the plate.

5. The lighting device of claim 4, wherein each of the light guide elements has at least one structure that has a different shape or is placed at a different location than all other light guide elements.

6. The lighting device of claim 1, wherein the framework is constructed to project light into a major part of an outer boundary of each light guide element, with the light being extracted predominantly at the structures.

7. An assist system, comprising a lighting device for visual warning or providing information, said lighting device including a light source, at least two plate-shaped light guide elements each having several linear structures to scatter or refract light which is protected into the light guide element, wherein the linear structures are configured as rods of light-conducting material, a framework maintaining the at least two light guide elements in close proximity such that their mid-perpendiculars lie on a common straight line, said framework being configured to at least partly surround a boundary of the light guide elements and to guide light, said framework coupled optically to the light source so that light is projected from the light source into the framework and from the framework into the light guide elements, and is conducted from the light guide elements to the outside.

8. The assist system of claim 7, wherein the framework includes rails into which the light guide elements are slidable.

9. The assist system of claim 7, wherein the framework is made substantially or entirely of a light guide.

10. The assist system of claim 7, wherein each of the light guide elements includes a transparent plate in which at least one structure is integrated to scatter or refract light which is projected into the plate.

11. The assist system of claim 10, wherein each of the light guide elements has at least one structure that has a different shape or is placed at a different location than all other light guide elements.

12. The assist system of claim 7, wherein the framework is constructed to project light into a major part of an outer boundary of each light guide element, with the light being extracted predominantly at the structures.

13. A motor vehicle comprising an assist system having a lighting device for visual warning or providing information, said lighting device including a light source, at least two plate-shaped light guide elements each having several linear structures to scatter or refract light which is projected into the light guide element, wherein the linear structures are configured as rods of light-conducting material, a framework maintaining the at least two light guide elements in close proximity such that their mid-perpendiculars lie on a common straight line, said framework being configured to at least partly surround a boundary of the light guide elements and to guide light, said framework coupled optically to the light source so that light is projected from the light source into the framework and from the framework into the light guide elements, and is conducted from the light guide elements to the outside.

14. The motor vehicle of claim 13, wherein the framework includes rails into which the light guide elements are slidable.

15. The motor vehicle of claim 13, wherein the framework is made substantially or entirely of a light guide.

16. The motor vehicle of claim 13, wherein each of the light guide elements includes a transparent plate in which at least one structure is integrated to scatter or refract light which is projected into the plate.

17. The motor vehicle of claim 16, wherein each of the light guide elements has at least one structure that has a different shape or is placed at a different location than all other light guide elements.

18. The motor vehicle of claim 13, wherein the framework is constructed to project light into a major part of an outer boundary of each light guide element, with the light being extracted predominantly at the structures.

* * * * *